June 26, 1934.    C. J. HANSEN ET AL    1,964,572
PROCESS FOR THE REMOVAL OF CARBON BISULPHIDE FROM GASES
Filed June 30, 1931
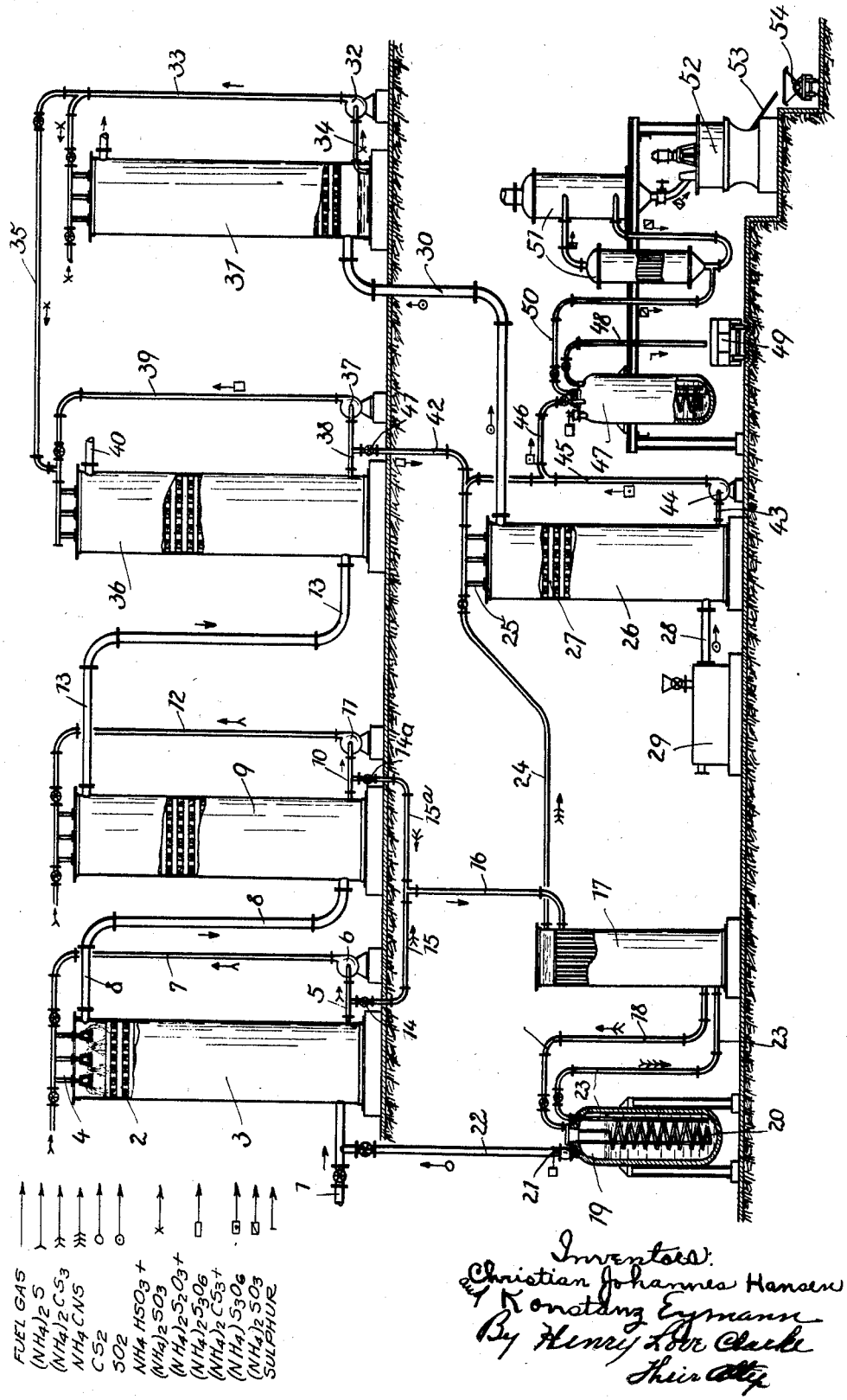

Patented June 26, 1934

1,964,572

UNITED STATES PATENT OFFICE 1,964,572

PROCESS FOR THE REMOVAL OF CARBON BISULPHIDE FROM GASES

Christian Johannes Hansen and Konstanz Eymann, Essen, Germany, assignors, by mesne assignments, to The Koppers Company of Delaware, Pittsburgh, Pa., a corporation of Delaware Application June 30, 1931, Serial No. 547,975
In Germany June 30, 1930

3 Claims. (Cl. 23—3)

The invention relates to the removal of carbon bisulphide from gases for instance coke oven gases and the object of the invention is a process for the removing of carbon bisulphide from gases, whereby the carbon bisulphide is recovered in a form, which may be converted into valuable products and whereby carbon bisulphide can be washed quantitatively out of the gas.

A further object of the invention is a process for working up the products resulting from the washing of the carbon bisulphide into ammonium sulphate and sulphur.

The process, according to the invention, for the removal of the carbon bisulphide from gases consists in bringing the gas containing the carbon bisulphide into contact with solutions of ammonium sulphide ($(NH_4)_2S$) whereby the carbon bisulphide, providing the contact is maintained sufficiently long, is converted quantitatively principally in ammonium thiocarbonate and some rhodan ammonium, both of which are perfectly solvable in the water of the ammonium sulphide washing solution and in this way they are removed from the gas. During the washing the reaction takes place according to the following equation:

$$CS_2 + (NH_4)_2S = (NH_4)_2CS_3$$

According to the invention, the ammonium thiocarbonate obtained in the manner described above can be converted by the heating up above 80° and possibly under pressure into rhodan ammonium and hydrogen sulphide according to the equation:

$$(NH_4)_2CS_3 = NH_4CNS + 2H_2S$$

As during the conversion it often happens that also a small quantity of carbon bisulphide is reformed from the thiocarbonate, it is of advantage to wash the gases and vapors arising from the decomposition of the thiocarbonate with a water solution of ammonium sulphide for the purpose of binding the carbon bisulphide which is reformed. Preferably, according to this invention for this purpose, the gases and vapors resulting from the decomposition of the thiocarbonate are returned to the gas containing ammonium sulphide to be washed and are brought into contact with the aqueous ammonium sulphide solution which serves to free the gases to be treated from carbon bisulphide.

For the purpose of converting the compounds finally obtained in the process according to this invention, viz. rhodan ammonium and hydrogen sulphide, into valuable salable products for instance, ammonium sulphate and sulphur, the hydrogen sulphide and rhodan ammonium are heated up preferably under pressure with sulphurous acid or with substances giving off or containing sulphurous acid, whereby the rhodan ammonium is converted in a well-known manner according to the equation:

$$NH_4CNS + 2SO_2 + 2H_2O = (NH_4)_2SO_4 + CO_2 + 2S$$

into ammonium sulphate and sulphur and there results from the hydrogen sulphide according to the general equation:

$$2H_2S + SO_2 = 2H_2O + 3S$$

elementary sulphur. In this connection it is of course also possible instead of heating up the hydrogen sulphide with sulphurous acid, to wash it out of the gas in solutions containing sulphur dioxide in free or combined form, for instance solutions of ammonium- or iron-thionates and then to heat up the solutions so obtained whereby ammonium sulphate and sulphur result.

Apparatus to carry out the process according to this invention is shown on the drawing in a side view and partially vertical section.

In the apparatus illustrated, the gas to be cleaned enters by a pipe line 1 first a washer 3 fitted up with the customary wooden hurdles 2, in which from above an aqueous solution of ammonium sulphide, which also may contain ammonium polysulphide, is distributed by the distributor 4. The washing fluid is distributed uniformly over the wooden hurdles of the washer and so comes into contact with the gas over a comparatively very large surface, whereby it removes from the gas the largest possible quantity of the carbon bisulphide by the formation of ammonium thiocarbonate and some rhodan ammonium. At the foot of the washer 3 the washing solution flows through the pipe line 5 to a pump 6 by means of which it is pumped back through the pipe line 7 to the distributing device 4.

The gas passes off at the top of the washer 3 by means of a pipe line 8 and enters the lower part of the washer 9 which inside is fitted up as is the washer 3 and in which the gas is washed likewise with an aqueous ammonium sulphide solution containing possibly ammonium polysulphide.

The solution arriving at the foot of the washer 9 is carried forward by the pipe line 10 to a pump 11 and from there through the pipe line 12 again to the usual distribution device at the top end of the washer 9.

During its passage through the washer 9, the gas loses its last traces of carbon bisulphide; it therefore passes off through the pipe line 13 at the top end of the washer, free from carbon bisulphide.

Continuously or intermittently, a portion of the liquids circulating in the towers 3 and 9 through the pipe line 15 and 15a controlled by the valve 14 and 14a, is drawn off and same is conducted in common through the pipe line 16 to the pipes of a heat exchanger 17, the function of which is explained below. From the heat exchanger 17 the ammonium thiocarbonate-rhodan-ammonium solution goes through the pipe line 18 into a heatable pressure vessel 19, in which the solution is heated up above a temperature of 80° C. by steam which is led forward by a heating coil 20. The gases thereby resulting are returned through the pipe line 22 by means of a valve 21 into the main gas pipe line 1 in front of the washer 3.

The hot fluid brought about by the reaction is led off from the pressure vessel 19 through the pipe line 23 to the other pipe system of the heat exchanger in which it gives up a part of its heat to the cold non-decomposed washing solution flowing through the other pipes of the heat exchanger and thus heating up the undecomposed solution.

From the heat exchanger 17 the liquid passes through the pipe line 24 to the distributing device 25 of a washing tower 26 which in a similar manner to towers 3 and 9 is fitted with wooden hurdles 27. In the tower 26 gases containing sulphur dioxide which are produced in a sulphur furnace 29 are led forward from below through the pipe line 28. The gases containing sulphur dioxide, after having giving up a part of the sulphur dioxide in the tower 26 to the solutions led over the hurdles, leave the washing tower 26 through the pipe line 30 and reach the washer 31 which in the usual manner is filled up with wooden hurdles, in which they are brought into contact with a solution of ammonium sulphite and ammonium bisulphite which show neither ammoniacal nor a sulphur dioxide tension so that in the washing tower the entire sulphur dioxide is removed from the gas from the furnace 29. The washing solution is kept in circulation in the washing tower 31 by means of the pump 32 which is connected up by the pipe lines 33 and 34 with the upper and lower end respectively. A portion of the fluid circulating in the washer 31 is carried forward through the pipe line 35 to the upper end of the washer 36 to the lower end of which the pipe line 13 is connected for leading in the gases freed from the carbon bisulphide, but still containing some hydrogen sulphide. In the washing tower 36 ammonium thiosulphate together with ammonium polythionate is formed. The washing solution is kept in circulation in the tower 36 by means of a pump 37 from where the liquid flowing off at the foot of the washer 38 is carried forward through the pipe line 39 to the upper end of the washing tower 36. The gas completely freed from carbon bisulphide and hydrogen sulphide leaves the tower 36 by the gas pipe line 40.

Intermittently or continuously a part of the fluid circulating in the washer 36 is drawn off through the pipe line 42 controlled by the valve 41 and is carried forward to the washer 26, in which it is brought into contact with the gases containing sulphur dioxide, whereby the ammonium thiosulphate contained in the spent washing liquor is converted wholly or partly into ammonium polythionate. The solution containing ammonium thionate and rhodan-ammonium flowing off from the foot of washer 26 through the pipe line 43 is raised again partly to the washer 26 by means of a pump 44 and a pipe line 45. Another part flows intermittently through the pipe line 46 to a heatable pressure vessel 47 in which the fluid is heated up to such a temperature under pressure that in a well-known manner ammonium thionate is decomposed into ammonium sulphate and sulphur and the rhodan-ammonium into ammonium sulphate, sulphur and carbon dioxide. The sulphur resulting from this reaction is collected in molten form in the lower part of the pressure vessel 47 and is led forward through the pipe line 48 into sulphur solidifying boxes 49 in which it can be, if desired, returned to the sulphur furnace 29. The liquid resulting from the reaction is carried forward through the pipe line 50 to a usual evaporating apparatus 51 in which the fluid now only containing ammonium sulphate is evaporated to the point of crystallization. The concentrated solution then reaches the centrifugal 52 in which the mother liquor is separated from the salt which finally is drawn off over a chute 53 into a transport lorry 54 from the centrifugal.

The carrying out of the process according to this invention is based on the following principles. It is assumed that a gas is to be purified which contains per 100 $m^3$ 30 grams of carbon bisulphide. In this case, the gas is first of all brought into contact with such quantities of a 1 to 2% aqueous ammonia bisulphide solution that every 100 $m^3$ gas are brought into contact with at least 26.9 grams ammonia bisulphide. Thereby is formed in the solution per 100 $m^3$ gas 55.8 grams ammonium thiocarbonate together with 0.5 gram rhodan-ammonium. The solution is now heated up whereby the thiocarbonate is converted into 29.5 grams rhodan-ammonium and 26.3 grams hydrogen sulphide. The rhodan-ammonium and the hydrogen sulphide are now heated up with 75 grams sulphur dioxide for 30 grams rhodan-ammonium +26.3 grams hydrogen sulphide to a temperature above 160° under pressure. There is formed sulphur, ammonium sulphate and $CO_2$ per 100 $m^3$ gas to be purified. The carbonic acid is blown off, the sulphur of the ammonium sulphate solution is separated out and the ammonium sulphate solution is finally evaporated to the point of crystallization.

The invention as hereinabove set forth is embodied in a particular form of construction, but may be variously embodied within the scope of the claims hereinafter made.

We claim

1. Process for the removal of carbon bisulphide from gases with recovery of useful admixtures comprising: bringing ammonium bisulphide in aqueous solution in contact with said gases and heating the liquor obtained by such washing of the gases so as to form rhodan ammonium, and treating the resulting solution with sulphur dioxide or compounds containing sulphur dioxide and heating under pressure so as to form ammonium sulphate and free sulphur therefrom.

2. Process for the removal of carbon bisulphide from gases with recovery of useful admixtures comprising: bringing ammonium bisulphide in aqueous solution in contact with said gases and heating under pressure the liquor obtained by such washing of the gases so as to form rhodan ammonium, and treating the resulting solution with sulphur dioxide or compounds containing sulphur dioxide and heating under pressure so as to form ammonium sulphate and free sulphur therefrom.

3. Process for the removal of carbon bisulphide from gases under recovery of useful admixtures consisting in bringing in contact ammonium bisulphide in an aqueous solution with said gases and heating under pressure the liquor obtained by the washing of the gases with the aqueous solution of ammonium bisulphide to form rhodan ammonium and treating the solution with sulphur dioxide or compounds containing sulphur dioxide so as to form ammonium sulphate and free sulphur therefrom.

CHRISTIAN JOHANNES HANSEN.
KONSTANZ EYMANN.